United States Patent
Knappe (10) Patent No.: US 6,922,396 B1
(45) Date of Patent: Jul. 26, 2005

(54) SYSTEM AND METHOD FOR MANAGING TIME SENSITIVE DATA STREAMS ACROSS A COMMUNICATION NETWORK

(75) Inventor: Michael E. Knappe, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 824 days.

(21) Appl. No.: 09/751,793

(22) Filed: Dec. 29, 2000

(51) Int. Cl.[7] ............................................. G01R 31/08
(52) U.S. Cl. ...................................... 370/252; 370/474
(58) Field of Search ................................. 370/229–240, 370/248, 252, 351–4, 469, 474, 476; 324/500, 76.11, 200–224

(56) References Cited

U.S. PATENT DOCUMENTS

| | | | |
|---|---|---|---|
| 5,315,591 A | 5/1994 | Brent et al. ............... | 370/85.6 |
| 5,936,939 A | 8/1999 | Des Jardins et al. ......... | 370/229 |
| 6,330,435 B1 | 12/2001 | Lazraq et al. ............... | 455/412 |
| 6,625,120 B1 | 9/2003 | Pillar et al. ................ | 370/230 |
| 6,643,259 B1 * | 11/2003 | Borella et al. .............. | 370/231 |
| 6,647,424 B1 * | 11/2003 | Pearson et al. .............. | 709/232 |
| 6,657,955 B1 | 12/2003 | Bonneau et al. ............. | 370/229 |
| 6,661,803 B1 | 12/2003 | Choi et al. .................. | 370/413 |
| 6,671,258 B1 | 12/2003 | Bonneau ..................... | 370/235 |
| 6,687,254 B1 | 2/2004 | Ho et al. .................... | 370/412 |
| 6,754,200 B1 | 6/2004 | Nishimura et al. ......... | 370/349 |
| 6,757,255 B1 | 6/2004 | Aoki et al. ................. | 370/252 |
| 2003/0039210 A1 * | 2/2003 | Jin et al. .................... | 370/229 |

OTHER PUBLICATIONS

ITEF RFC 2598, An Expedited Forward PHB, Jun. 1999, pp.: 1–10.*
IETF RFC2475, An Architecture for Differentiated Services, Dec. 1998, pp.: 1–35.*
IEFT RFC 1349, Type of Service in the Internet Protocol Suite, Jul. 1992, pp.: 1–24.*

* cited by examiner

Primary Examiner—David Vincent
(74) Attorney, Agent, or Firm—Baker Botts L.L.P.

(57) ABSTRACT

A system and method for managing data streaming data include the capability to receive a plurality of packets, each packet associated with a data connection, at least some of the packets being part of a data stream. The system and method further include the capability to perform congestion control by discarding at least some of the packets and to set an indicator in at least some of the subsequent packets in the data stream to indicate that packets in the data stream have been discarded if packets in the data stream have been discarded.

43 Claims, 4 Drawing Sheets

SYSTEM AND METHOD FOR MANAGING TIME SENSITIVE DATA STREAMS ACROSS A COMMUNICATION NETWORK

TECHNICAL FIELD OF THE INVENTION

This invention relates generally to communication networks and, more specifically, to a system and method for managing time sensitive data streams across a communication network.

BACKGROUND OF THE INVENTION

Systems for sending data from one device to another device by the use of packets are well known. For example, in the Internet context, when a personal computer requests a file from a remote server, the server sends the file to the Internet, a type of communication network, as a series of packets, each packet containing part of the file. The packets typically encounter a number of routing devices during their traversal of the Internet, each device examining each packet and determining how to route the packet so that it will reach the personal computer.

More recently, systems have been developed for sending data representing audible sound from one device to another device, such as from one telephone to another telephone, by the use of packets. Each packet contains data that represents a time segment of audible sound. As a group, the packets are sometimes referred to as a "data stream" because a steady flow of packets is typically required to represent a large time period of audible sound, such as a song.

Unfortunately, these systems have limited schemes for ensuring sound quality if the communication network becomes congested. Congestion may occur if a routing device has more packets to route in a given time period than it has the capacity to route. A congested routing device typically discards some of the packets that it has to be routed and, thus, produces problems at a device that is generating audible sounds as it receives the packets, because the device is not receiving data from which to generate the audible sounds does not receive all of the data. Moreover, resending the discarded packets is probably not acceptable because they will arrive out of sequence with the other packets in the data stream. Thus, the data is time sensitive.

For sending packets containing audible sound data over the Internet, the schemes for ensuring delivery fall into two categories—prioritization and reservation. Prioritization schemes typically use an indicator in each packet to specify the relative priority of the packet. The indicator is typically set low for general data and high for audible sound data, allowing a routing device to prioritize the discarding of packets that it receives. This scheme, however, does not prioritize between packets that have similar priorities. Thus, if the packets containing audible sound data are contributing to the congestion, the routing device does not know how to resolve the conflicts between the similar priorities. Reservation schemes, on the other hand, typically entail reserving an amount of routing capacity in each intervening routing device. Thus, the packets containing audible sound data are assured of being conveyed at a specified rate. This scheme, however, requires a significant amount of overhead in reserving an appropriate amount of routing capacity at each intervening routing device and may further congest the communication network if too much capacity is reserved at the intervening routing devices or if the capacity is reserved when packets will be sent only intermittently.

SUMMARY OF THE INVENTION

The present invention provides a method and system for managing data streams containing time sensitive data across a network that substantially reduce or eliminate at least some of the disadvantages and problems associated with previously developed systems and methods. In particular embodiments, the present invention controls packet loss in data streams containing audio data to allow congestion control across the network without significantly impacting the quality of the output produced based on the audio data.

In some embodiments, the present invention provides a method for managing data streams that includes receiving a plurality of packets, each packet associated with a data connection, at least some of the packets being part of a data stream. The method also includes performing congestion control by discarding at least some of the packets and setting an indicator in at least some of the subsequent packets in the data stream to indicate that packets in the data stream have been discarded if packets in the data stream have been discarded.

In certain embodiments, the present invention provides a network element for transporting packetized data. The network element includes a communication interface operable to receive a plurality of Internet protocol (IP) packets, each packet associated with a data connection, at least some of the packets being part of a data stream containing audio data. The network element also includes a memory coupled to the communication interface, the memory operable to buffer the IP packets. The network element further includes a processor coupled to the memory, the processor operable to perform congestion control based on a priority value in the type-of-service (TOS) field of each packet and increase the priority value in the TOS field for at least some of the subsequently routed packets in the data stream to indicate that packets in the data stream have been discarded if packets in the data stream have been discarded.

Technical advantages of the present invention include providing an improved method and system for managing time sensitive data streams across a network. In a particular embodiment, packet loss in voice and other suitable data streams is controlled to allow congestion control without significantly impacting the integrity of the stream or the output produced based on the data in the data stream. For example, once some packet loss has occurred in a particular voice data stream, further loss is avoided until loss mitigation mechanisms for the data stream have built up a usable history of the data stream again.

Another technical advantage of one or more embodiments of the present invention includes providing network wide congestion control for time sensitive data streams. In particular, routing devices perform congestion control on a data stream based on the operations other routing devices have performed on the data stream. For example, in a particular embodiment, when a routing device discards packets from a data stream, the routing device sets an indicator in subsequently routed packets in the data stream to inform subsequent routing devices that packets have been discarded from the data stream. Thus, in these embodiments, if a subsequent routing device becomes congested, it may try to avoid discarding any more packets from the data stream, an event that might degrade the quality of the data to an unacceptable level.

Still another technical advantage of one or more embodiments of the present invention includes providing improved quality of service of audio in congested network conditions. In particular, data streams containing audio are temporarily prioritized based on upstream packet loss to allow fair and equitable congestion control between voice streams having otherwise similar priorities and limiting packet losses from any one particular data stream in any finite period of time.

Yet another technical advantage of one or more embodiments of the present invention includes providing a method and system for temporarily prioritizing data streams in a network. In particular, a router or other suitable device may adjust a priority of a data stream based on intradevice congestion or other control in order to control the treatment of the data stream by upstream and or downstream devices.

Other embodiments may possess none, one, some, or all of these technical features and advantages and/or additional technical features and advantages. Moreover, other technical features and advantages will be readily apparent to one of skill in the art from the following figures, description, and claims.

BRIEF DESCRIPTION OF THE DRAWINGS

To provide a more complete understanding of the present invention, especially when considered in light of the following written description, and to further illuminate its technical features and advantages, reference is now made to the following drawings, in which.

DETAILED DESCRIPTION OF THE INVENTION

Figure 1:
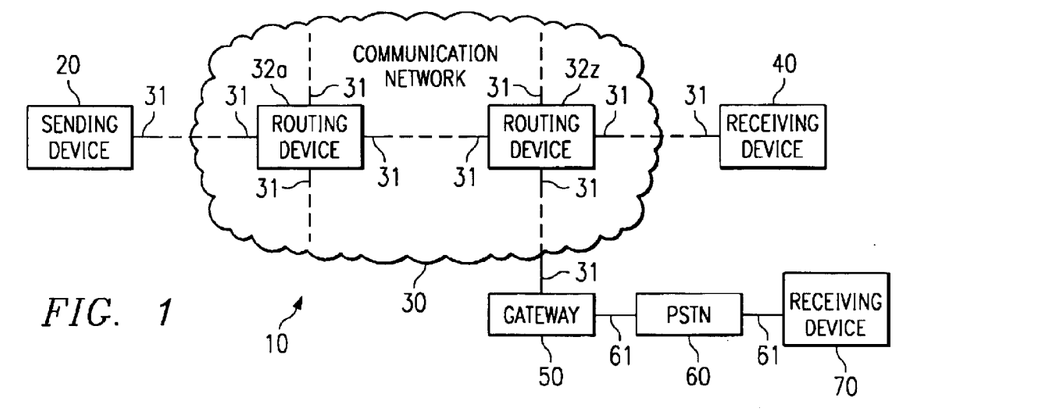
FIG. 1 illustrates one embodiment of a communication system for transporting data between endpoints.

FIG. 1 illustrates one embodiment of a communication system 10 for transporting data between endpoints. The data transported by communication system 10 includes streaming data, which includes digital representations of audio, video, text, and/or any other type of information that need to be delivered in a time sensitive or real-time manner. Communication system 10 includes a sending device 20, a communication network 30, and a receiving device 40. Communication network 30 includes a plurality of routing devices 32a–z. Sending device 20, routing devices 32a–z, and receiving device 40 are coupled together by communication links 31.

In operation, sending device 20 sends streaming data destined for receiving device 40 to communication network 30 in packets, each packet containing part of the data and the set of packets forming a data stream. In general, a packet is any type of message that conveys a piece of data. Note, the packets may have different sizes. Communication network 30, possibly with the use of other devices, conveys each packet in the data stream to routing device 32a, which determines how to route each packet in the data stream. Typically, routing devices 32a–z examine a destination address in a packet to determine how to route it, although any other indicator in or associated with the packet may be used. Upon determining how to route a packet, routing device 32a sends the packet along the route, to routing device 32z in the illustrated embodiment. The packet may travel directly or indirectly, possibly through other devices of communication network 30, to routing device 32z. Upon receiving the packet, routing device 32z also determines how to route the packet. After determining how to route the packet, routing device 32z sends the packet along the route, to receiving device 40 in the illustrated embodiment. The packet may travel directly or indirectly, possibly through other devices of communication network 30, to receiving device 40. Upon receiving the packet, receiving device 40 converts the data in the packet into output that is useful to a user of receiving device 40.

Note, while receiving the packets in the data stream, routing devices 32a–z may be receiving other packets that need to be routed and, accordingly, will have to manage the routing of all the packets received. Some of the other packets may be part of data connections, a general transfer of data from one device to another device, and some may even be part of other data streams. Typically, the packets have associated priorities that the routing device will be able to discover and use to route the packets. Thus, if the packets in the data stream have a relatively high priority, they may be routed preferentially by routing device 32a. Schemes for routing packets based on priority include weighted fair queuing and round robin queuing; other schemes are well known in the art.

If routing devices 32a–z have fewer packets to route in a time period than their capacity to route, they should be able to route all of the packets. If, however, one of routing devices 32a–z has more packets to route in a time period than it has capacity to route, the routing device will probably be congested. Congestion may be caused by packets arriving faster than a routing device can itself route packets, packets arriving over a large bandwidth link being destined for a small bandwidth link, or any other appropriate factor.

Focusing on routing device 32a, if this routing device becomes congested, it may decide to discard some of the packets to alleviate the congestion. In discarding the packets, routing device 32a may analyze the packets to determine the type and/or priority of the data that they contain and then discard the packets containing lower priority data.

Sometimes, however, routing device 32a may decide to discard some of the packets from the data stream. For many types of data streams, losing the data from only a few packets is not particularly detrimental, and routing device 32a might identify the data in the data stream as of this type. If routing device 32a decides to discard packets from the data stream, routing device 32a, once it has discarded a threshold number of packets, sets an indicator in subsequently routed packets in the data stream that will indicate to routing device 32z, and possibly receiving device 40, that some of the packets in the data stream have been discarded. The indicator may be a change to a type-of-service (TOS) indicator, a quality-of-service (QOS) indicator, a priority indicator, a flag, or any other type of indicator for a packet.

Routing device 32a may set the indicator in subsequently routed packets for an amount of time, such as, for example, one second, for an amount of packets, such as, for example, ten, for an amount of information represented by the data in the packets, such as, for example, two seconds of audible sound, or any other appropriate amount. In a particular embodiment, the indicator may be set in enough packets to allow receiving device 40 to establish an acceptable operating state after failing to receive the discarded packets.

After setting the indicator in an appropriate number of packets, routing device 32a would not set the indicator unless it again discarded packets from the data stream.

Routing device 32a may discard the packets for the data stream in a variety of manners. For example, routing device 32a may discard consecutive packets, every other packet, or every third packet or use any other discard scenario. Note, sometimes routing device 32a may decide that it will also discard future packets in the stream. In these instances, routing device 32a may discard the appropriate packets in the data stream when they arrive to complete the discard operation.

Upon receiving the packets in the data stream that have the indicator set, routing device 32z routes the packets to receiving device 40 as before. If, however, routing device 32z also becomes congested, routing device 32z may also examine the packets that it is to route to determine which packets it will discard. In making this determination, routing device 32z may examine the indicators that might have been set in certain packets in the data stream by routing device 32a. Upon determining that packets have already been discarded from the data stream, routing device 32z will try to avoid discarding any more of the packets from the data stream. Thus, by setting the indicator in subsequently routed packets, routing device 32a attempts to prevent later routing devices from discarding any more packets from the data stream, at least for a given amount of packets, time, or information.

On the other hand, sometimes even discarding an acceptable number of packets from each data stream does not alleviate the congestion. In such cases, routing device 32z may decide to discard more packets from data streams. To accomplish this, routing device 32z may discard some packets in a relatively large number of data streams, which would degrade the data quality in all of these data streams to an unacceptable level, or discard a relatively large number of packets in a few data streams, which would only degrade the data quality in those data streams to an unacceptable level. Other schemes exist.

Receiving device 40 may have the ability to compensate for the loss of some packets from the stream. To determine if packets have been discarded, receiving device 40 may examine the indicator in the packets. Upon detecting a loss of packets, receiving device 40 may attempt to compensate for the missing segments, by, for example, estimating the discarded data, ignoring the discarded data, providing an indication to the user that data has been lost, or otherwise compensating for the fact that not all of the data was received. Receiving device 40 may use digital signal processing, statistical analysis, or any other appropriate method to mitigate the loss of data.

Communication system 10, as illustrated in FIG. 1, also includes a gateway 50, a public switched telephone network (PSTN) 60, and a receiving device 70. Gateway 50 is coupled to communication network 30 by one of communication links 31 and PSTN 60 by one of PSTN links 61. Receiving device 70 is also coupled to PSTN 60 by one of PSTN links 61.

In operation, gateway 50 receives packets that are part of a data stream for receiving device 70 from communication network 30 and converts them into a format appropriate for PSTN 60 and/or receiving device 70. Gateway 50 then sends the converted data to PSTN 60, which conveys the converted data to receiving device 70. Upon receiving the converted data, receiving device 70 processes the data into a format useful for a user of receiving device 70.

The components of communication system 10 may have a variety of forms. For example, sending device 20 may be a softphone, a personal computer (PC), a personal digital assistant (PDA), a cellular telephone, a server, or any other type of device that can provide digital audio, video, text, and/or any other type of information that may be sent over a period of time. Sending device 20 may store, generate, and/or retrieve the data. Communication network 30 may be a transmission control protocol/Internet protocol (TCP/IP) network, a frame relay network, an X.25 network, an asynchronous transfer mode (ATM) network, or any other type of system for conveying information from one point to another point. Routing devices 32a–z may be routers, brouters, gateways, IP switches, routing switches, or any other type of device that can receive a packet, determine a route for the packet, and send the packet along the route. Receiving device 40 may be a softphone, a personal computer (PC), a personal digital assistant (PDA), a cellular telephone, or any other type of device that can receive streaming data and generate output intelligible to a user based on the streaming data. Communication links 31 may be wireline links, wireless links, optical links, or any other type of medium that can convey information from one point to another point. Receiving device 70 may be a PC, a softphone, a PDA, a cellular telephone, a conventional telephone, or any other type of device that can generate output intelligible to a user.

Figure 2:
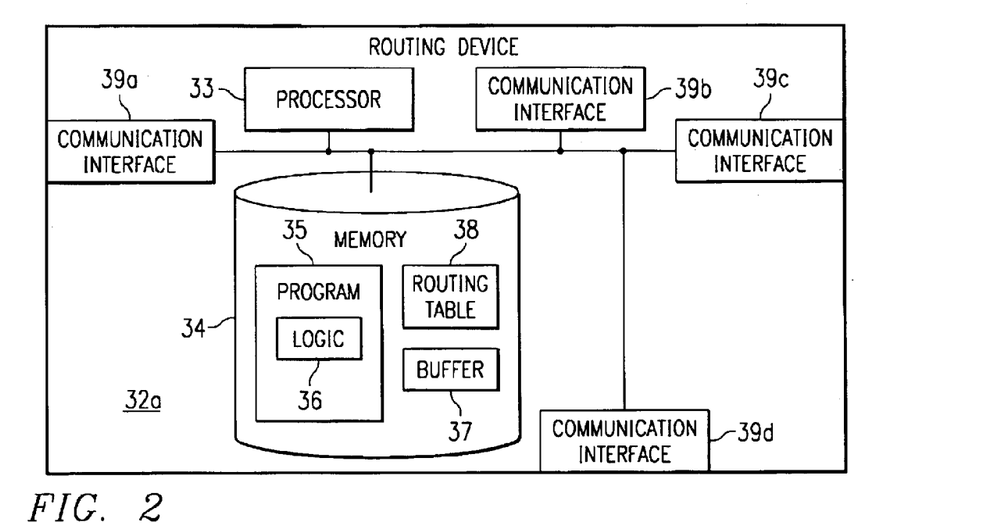
FIG. 2 illustrates a detailed view of one embodiment of a routing device for the communication system of FIG. 1.

FIG. 2 illustrates a detailed view of one embodiment of routing device 32a for communication system 10. In this embodiment, routing device 32a contains one centralized processor for performing all of the routing operations. As illustrated, routing device 32a includes a processor 33, a memory 34, and a set of communication interfaces 39a–d. Communication interfaces 39a–d are adapted to be coupled to communication links 31 and to send information to and receive information from other devices in communication network 30, sending device 20, and/or receiving device 40. Memory 34 is coupled to communication interfaces 39a–d and is operable to store the received information. Memory 34 also includes a program 35, which includes a set of logic 36, a buffer 37 for storing certain information, and a routing table 38, which determines which of communication interfaces 39a–d is associated with a destination address. Processor 33 is also coupled to memory 34. Processor 33 is operable to process the information received through communication interfaces 39a–d and send at least some of the information through communication interfaces 39a–d.

In operation, communications interfaces 39a–d receive a variety of packets from other devices in communication network 30 and/or a variety of sending devices, such as, for example, sending device 20. Communication interfaces 39a–d then send these packets to memory 34, which stores the packets in buffer 37. Processor 33, according to logic 36 in program 35, periodically checks for packets in buffer 37. Upon detecting a packet in buffer 37, processor 33 determines which of communication interfaces 39a–d the packet should be sent through. To accomplish this, processor 33 may examine the packet to determine its destination address, which packets typically have, and examine routing table 38, which is a cross reference between destination addresses and communication interfaces 39a–d. Thus, by knowing a destination address, processor 33 may determine which of communication interfaces 39a–d to send the packet through. Upon determining which of communication interfaces 39a–d the packet should be sent through, processor 33 sends the packet to the appropriate one of communication interfaces 39a–d. Note, if a variety of packets are to be sent through one of communication interfaces 39a–d in a given time interval, processor 33 may schedule the packets for that communication interface by ordering them in buffer 37. For example, processor 33 may route the packets using a priority scheme.

In certain instances, routing device 32a may become congested. For example, routing device 32a may become congested if the total number of packets to be routed in a given time interval is greater than the capability of processor 33 to route the packets, if the number of packets to be sent through one of communication interfaces 39a–d in a time interval is greater than the capability of the communication interface to send packets, or through any other appropriate manner. Regardless of how it becomes congested, processor 33 will have to decide how to discard packets to alleviate the congestion.

To accomplish this, processor 33 may first begin by determining which packets are not part of a data stream. Processor 33 may then discard up to all of the identified packets in attempting to alleviate the congestion. If the congestion persists, processor 33 may determine whether any packets are part of a data stream. Processor 33 may identify packets as being part of a data stream in a variety of manners, such as, for example, by examining a type-of-service (TOS) indicator in the packet, a quality-of-service (QOS) indicator in the packet, the destination address of the packet, and/or any other appropriate indicator. Upon identifying a packet as being part of a data stream, processor 33 may discard the packet from the data stream. Processor 33 may continue to do this for all of the packets that are part of data streams.

Upon discarding a determined number of packets from a particular data stream, processor 33 may then set an indicator in at least some of the subsequently routed packets in the data stream so that other routing devices in communication network 30, such as, for example, routing device 32z, will know that packets in the data stream have already been discarded. Processor 33 may do this by changing a TOS indicator in the packet, changing a QOS indicator in the packet, setting a flag in the packet, or using any other appropriate type of indicator in or associated with the packet. Processor 33 will set this indicator in an appropriate number of subsequently routed packets in the data stream.

The number of packets to discard before setting the indicator may be a preset value or one currently calculated by processor 33. For example, by examining a packet, processor 33 may determine that the packet is part of a data stream that contains audio data. Moreover, processor 33 may know that it may discard up to a certain number of packets that contain audio data before it exceeds the threshold for setting the indicator. Thus, processor 33 knows that after discarding the threshold number of packets in the data stream that it needs to set the indicator in subsequently routed packets. As another example, processor 33 may examine the packet to determine the amount of data in the packet, the type of information represented by the data, and/or any other type of information about the packet. From this, processor 33 may determine the amount of information represented by each packet and what the threshold number of packets is before beginning to set the indicator. For example, processor 33 may know that data representing thirty milliseconds of audio may be discarded from data representing one-hundred milliseconds of audio. Thus, if each packet represents ten milliseconds of audio, processor 33 may determine that it may discard three out of ten packets. A variety of other schemes for determining the threshold will be readily suggested to those skilled in the art.

To determine when a threshold number of packets has been discarded, processor 33, possibly with the help of memory 34, may use a counter to determine how many packets have been discarded from each data stream. Additionally, processor 33 may, with packets that are sequentially numbered, examine the sequence numbers to determine how many packets have previously been discarded from the data stream and use this information in determining whether the threshold has been met. The counter may be reset after a period of time, a number of packets, or any other appropriate criteria.

In deciding to discard packets from a data stream, processor 33 may determine the maximum number of packets that may be discarded from that data stream without significantly degrading data quality. The maximum number may be a preset value, a preset value based on the type of data carried by the packets in the data stream, a value determined by processor 33 after analyzing the packets, or any other type of value. Processor 33 may be able to determine the maximum number of packets that may be discarded from a data stream in much the same way that it determines the threshold number of packets to discard before setting the indicator. For example, if the data in the packets represents audible sound, discarding data that represents thirty milliseconds of audio from data that represents one-hundred milliseconds of audio may result in a substantial degradation in audio performance at a receiving device, such as receiving device 40. Thus, if processor 33 can determine the type and amount of information represented by the data in each packet in a particular data stream, processor 33 may be able to determine how many packets it may discard from the data stream without significantly degrading data quality.

The type and amount of information represented by the data in each packet may usually be determined by examining the packet. For example, a packet typically indicates the amount of data in the packet, possibly by including an indicator of the size of the data field, and the type of data, possibly by including an indicator of the encoding scheme or the type of data. From these parameters, processor 33 may determine how many packets may be discarded. Other schemes will be readily suggested to those skilled in the art.

Additionally, before deciding whether to discard packets from a data stream, processor 33 may examine a packet in the data stream to determine whether packets in the data stream have already been discarded. Processor 33 may accomplish this by examining a TOS indicator in a packet, a QOS indicator in a packet, a flag in a packet, a sequence number in a packet, or any other type of indicator that may indicate that packets in the data stream have been discarded. In a particular embodiment, a TOS indicator may be examined to determine whether packets in the data stream have already been discarded. If packets have already been discarded from the data stream, processor 33 will try to avoid discarding any more packets from the data stream. If, however, no packets have been discarded from the data stream, processor 33 may proceed as previously discussed.

In a particular mode of operation, processor 33 may determine that it has discarded all of the identified packets that are not part of a data stream, that it has discarded the maximum number of packets from the data streams, and that it is still congested. In such a case, processor 33 may begin to discard all of the packets in a particular data stream in order to try to alleviate the congestion. To accomplish this, processor 33 may determine whether the packets in one data stream have a different priority from the packets in another data stream and, if so, discard the packets with the lower priority. Note, processor 33 may determine priority by examining a priority indicator in a packet, by determining the type of information represented by the data in the packet, from which it can determine a priority, or by using any other appropriate indicator. Alternatively, processor 33 may randomly select one of the data streams from which to discard packets. On the other hand, processor 33 may examine the packets in each data stream to determine whether any data streams have a large number of packets and/or large packets. Processor 33 may then begin discarding packets from these data streams because they are consuming a large portion of its routing capability. A variety of other selection criteria will be readily suggested to those skilled in the art.

The components of routing device 32a may have a variety of forms. Processor 33 may a complex instruction set computer (CISC), a reduced instruction set computer (RISC), or any other type of device for manipulating electronic information. Memory 34 may be random access memory (RAM), compact-disk read-only memory (CD-ROM), or any other type of electronic or optical volatile or non-volatile device for storing information. Buffer 37 may be a physical part of or logical association of memory 34. Communication interfaces 39a–d may be network interface cards, modems, or any other type of devices for exchanging information between components in a communication network.

Additionally, the components of routing device 32a may have a variety of arrangements. For example, routing device 32a may have more or less than communication interfaces 39a–d. As another example, memory 34 may be divided into several memories or partially stored or encoded on processor 33. As a further example, processor 33 may have a variety of sub-processors, such as, for example, a sub-processor for determining the route for a packet, a sub-processor for scheduling packets to be routed, and a sub-processor for resolving congestion. A variety of other arrangements will be readily suggested to one skilled in the art.

As discussed with respect to routing device 32a, the present invention has several technical features and advantages. For example, the invention provides for discarding only some of the packets from a data stream in attempting to alleviate congestion. Thus, the invention attempts to alleviate congestion without significantly degrading the quality of output that may be generated based on the packets in the data stream. As another example, the invention provides for discarding an unacceptable number of packets from some data streams while maintaining an acceptable number of packets in other data streams. Thus, the invention allows the quality of data in at least some data streams to be maintained at an acceptable level instead of degrading the quality of data in all data streams to an unacceptable level. As an additional example, the present invention allows routing devices that discard packets from a data stream to inform subsequent routing devices that packets have been discarded from a data stream. Thus, if a subsequent routing device decides to discard packets, perhaps because it is congested, it may attempt to avoid discarding any more packets from the data stream. Other embodiments may possess none, one, some, or all of these technical features and advantages and/or additional technical features and advantages.

Figure 3:
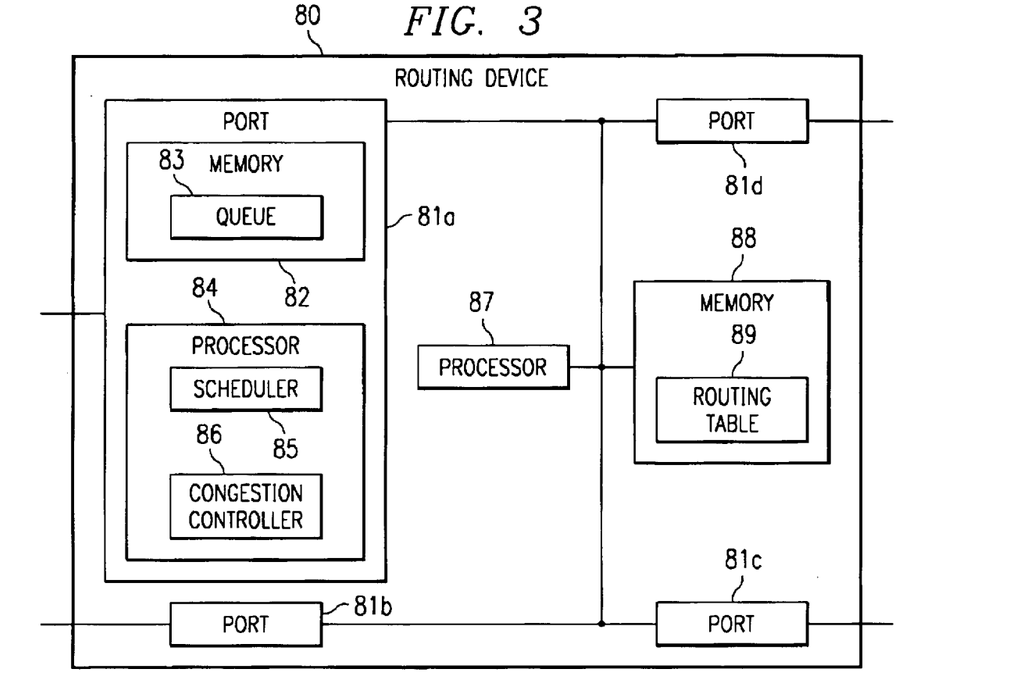
FIG. 3 illustrates a detailed view of another embodiment of a routing device for the system of FIG. 1.

FIG. 3 illustrates a detailed view of a routing device 80, which may also be used in communication network 30. Routing device 80 includes ports 81a–d, a processor 87, and a memory 88. Each of ports 81a–d includes a memory 82, which includes a queue 83, and a processor 84, which includes a scheduler 85 and a congestion controller 86. Memory 88 includes a routing table 89.

In operation, ports 81a–d receive packets from a variety of components in communication network 30. When one of ports 81a–d receives a packet, the port stores the packet in the associated queue 83 in memory 82. Processor 87 then determines through which of ports 81a–d the packet should be sent based on routing table 89 in memory 88. Upon determining through which of ports 81a–d the packet should be sent, processor 87 facilitates sending the packet from queue 83 of the receiving port to queue 83 of the sending port.

Upon receiving a packet to be sent, the sending port places the packet in the associated queue 83. Scheduler 85 of the sending port then schedules the packet for sending, along with any previously scheduled but as of yet unsent packets. Scheduler 85 may schedule packets based on the order in which the packets were received, the priority of each packet, the order in which the packets were received and the priority of each packet, and/or upon any other suitable criteria. The packets are sent in accordance with the order determined by scheduler 85.

Congestion controller 86 of the sending port periodically examines queue 83 to determine whether the associated port is, or is about to be, congested. If the port is, or is about to be, congested, congestion controller 86 is responsible for determining how to manage the packets to be sent in queue 83. To accomplish this, congestion controller 86 may decide to discard some of the packets. For example, congestion controller 86 may decide to discard packets that are not part of a data stream before discarding packets that are part of a data stream. Once congestion controller 86 has discarded any packets that are not part of a data stream, congestion controller 86 may decide to discard packets that are part of a data stream if congestion still exists. Congestion controller 86 may operate in much the same manner as processor 33, illustrated in and discussed with respect to FIG. 2, for discarding the packets that are part of a data stream.

The components of routing device 80 may have a variety of forms. Processor 84 and processor 87 may be CISCs, RISCs, or any other type of devices for manipulating electronic information. Memory 82 and memory 88 may be RAMs, CD-ROMs, or any other type of electromagnetic or optical volatile or non-volatile devices for storing information. Queue 83 may be a physical part of or logical association of memory 82. Ports 81a–d may be network interface cards, modem cards, line interface cards, or any other type of device for sending information to and receiving from other components of a communication network. Note, ports 81a–d may have communication interfaces.

Additionally, the components of routing device 80 may have a variety of arrangements. For example, routing device 80 may have more or less than ports 81a–d. As another example, processor 84 may perform the operations of scheduler 85, and thus, scheduler 85 is not needed. As a further example, queue 83 may have two parts, one for received packets and one for packets to be sent. A variety of other arrangements exist.

Figure 4:
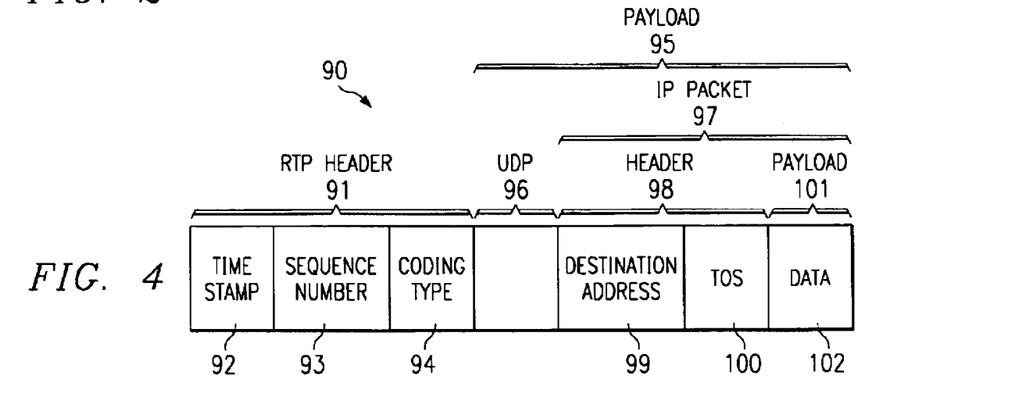
FIG. 4 illustrates a packet used to transport data across the communication system in FIG. 1 in accordance with one embodiment of the present invention.

FIG. 4 illustrates a packet 90 that may be used in communication system 10. As illustrated, packet 90 is an IP packet encapsulated in a Real-Time Transfer Protocol (RTP) packet. Packet 90 includes a header section 91 and a payload section 95. While packet 90 represents one type of packet for use in communication system 10, a variety of other packet types and/or configurations will be readily suggested to one skilled in the art.

Header section 91 includes a time stamp field 92, a sequence number field 93, and a coding type field 94. The data in time stamp field 92 indicates the time that the data in payload section 95 was processed, and the data in sequence number field 93 indicates what number packet 90 is in the data stream. The sequence number may be useful for determining whether packets have been discarded from a data stream. The data in coding type field 94 indicates what type of encoding scheme was used on the data in payload section 95. For example, data that represents audible sounds may be encoded using G.711, G.729, MP3, or any other appropriate type of scheme for representing audio, and data that represents video may be encoded using MPEG-2, QuickTime, or any other appropriate type of scheme for representing video. By examining coding type field 94 and the size of payload section 95, routing devices 32a–z may determine, at least in general, how much information is represented by the data in packet 90. Knowing how much information that the data in packet 90 represents may be used in determining the threshold for setting the indicator indicating that packets have been discarded from a data stream, determining an acceptable number of packets to discard from a data stream, and/or determining how many subsequently routed packets in a data stream in which to set the indicator after discarding packets from the data stream.

Payload section 95 includes a user datagram protocol (UDP) section 96 and an IP packet 97. UDP section 96 indicates the port for which packet 90 is destined at the receiving device. IP packet 97 includes a header section 98 and a payload section 101. Header section 98 includes a destination address field 99 and a type-of-service (TOS) field 100. The data in destination address field 99 indicates a destination for packet 90, and the data in TOS field 100 indicates what type of and/or what priority of data packet 90 is carrying. For example, the data in TOS field 100 may indicate that packet 90 is carrying general data, audio data, video data, low priority data, high priority data, or any other type of data. Thus, by examining TOS field 100, routing devices 32a–z may determine, or at least have an indication of, what type of data and/or what priority of data packet 90 contains. In a particular embodiment, a value of zero in TOS field 100 indicates that the packets contains general data, a value of four in TOS field 100 indicates that the packets contain audio data, and a value of five in TOS field 100 indicates that the packets contain audio data and that some of the packets in the data stream have been discarded. Note, an extension could be placed in header section 91 to indicate the discardability of packet 90, although having to examine this may be slower than examining TOS field 100. Payload section 101 of IP packet 97 includes the data representing the time sensitive information, such as, for example, audible sound. Payload section 101 may be of varying sizes.

Figure 5:
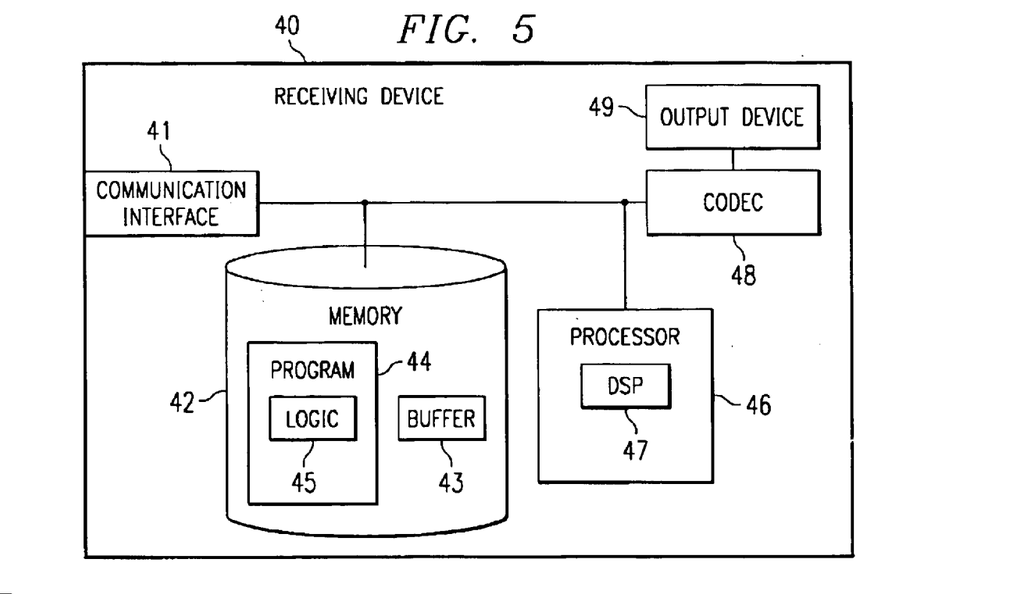
FIG. 5 illustrates a detailed view of one embodiment of a receiving device for the communication system of FIG. 1.

FIG. 5 illustrates a detailed view of one embodiment of receiving device 40 for communication system 10. As illustrated, receiving device 40 includes a communication interface 41, a memory 42, a processor 46, a coder/decoder (codec) 48, and an output device 49. Communication interface 41 is adapted to be coupled to one of communication links 31 and is operable to receive packets from communication network 30. Memory 42 is coupled to communication interface 41 and is operable to store the received packets in a buffer 43. Memory 42 also includes a program 44 containing a set of logic 45 for processor 46. Processor 46 is coupled to memory 42 and includes a digital signal processor (DSP) 47. Processor 46 is operable to perform any necessary processing on a packet or the data in the packet, such as format conversion or signal processing. Codec 48 is also coupled to memory 42 and is operable to convert the data in a packet into electrical signals appropriate for output device 49. Output device 49 is operable to generate output that is intelligible to a user of receiving device 40.

In operation, communication interface 41 receives packets that are part of the data stream from communication network 30. After communication interface 41 receives a packet, communication interface 41, perhaps after removing a protocol used to send the packet through communication network 30, such as, for example, Ethernet, forwards the packet to buffer 43 of memory 42. Processor 46, according to logic 45 in program 44, examines buffer 43 periodically to determine whether any packets are present. Upon detecting a packet in buffer 43, processor 46 determines whether any processing needs to be performed on the packet. For example, processor 46 may have to remove a protocol used to send the packet through communication network 30, such as, for example, TCP/IP, or may have to examine the packet to determine whether packets in the data stream have been discarded. Processor 46 may determine the latter by examining whether an indicator has been set in the packet, by examining a sequence number of the packet, and/or by any other appropriate manner. If processor 46 determines that packets in the data stream have been discarded, DSP 47 processes the data in the received packet to estimate the data that was discarded, smooth the data that is available, or otherwise process the received data for output. After any processing is performed on the data in the packet by processor 46, the data is sent to codec 48, which converts the data, perhaps after decoding it from an encoded format, such as, for example, G.711, into signals that are useful to output device 49. The signals are then sent to output device 49, which generates output intelligible to a user of receiving device 40.

The components of receiving device 40 may have a variety of forms. Communication interface 41 may be a network interface card, a modem, or any other type of device for receiving electronic information. Memory 42 may be RAM, CD-ROM, or any other type of electromagnetic or optical volatile or non-volatile device for storing information. Processor 46 may be a RISC, a CISC, or any other type of device for manipulating electronic information. DSP 47 may be a RISC, a CISC, an application specific integrated circuit (ASIC), or any other type of device for manipulating electronic information. Codec 48 may be a sound card, a video graphics adapter card, or any other type of device for converting digital information into signals appropriate for output device 49. Output device 49 may be a speaker, a cathode ray tube display, a liquid crystal display, or any other type of device for generating output that is intelligible to a user of receiving device 40.

Additionally, although a variety of operations and a distribution of those operations have been discussed with respect to receiving device 40, in other embodiments, receiving device 40 may have fewer operations, additional operations, and/or a different distribution of operations. For example, processor 46 may, based on program 44, perform all of the operations of DSP 47, making DSP 47 unnecessary. As another example, the operations of communication interface 41 may be performed by processor 46. As a further example, receiving device 40 may have an input device so that a user may specify how to generate output based on the data in the received packets. A variety of other operations and distributions of operations for receiving device 40 will be readily suggested to those skilled in the art.

Returning briefly to FIG. 1, the operations just discussed for receiving device 40 may be distributed between gateway 50 and receiving device 70. For example, if receiving device 70 is a conventional telephone, gateway 50 will be responsible for receiving the packets in the data stream, which, of course, will contain data representing audible sound, from communication network 30 and converting the data into a form appropriate for communication through PSTN 60. Gateway 50 will also be responsible for performing any necessary digital signal processing to the data before communicating it through PSTN 60. Receiving device 70 will then convert the signals received through PSTN 60 into audible sounds. As another example, if receiving device 70 possesses processing capabilities, gateway 50 may simply convert the packets from a form appropriate for communication network 30 to a form appropriate for PSTN 60. This could happen, for example, if gateway 50 is an Internet Service Provider (ISP) and receiving device 70 is a personal computer. Thus, receiving device 70 would be responsible for converting the data in the packets into a format that is useful to a user of receiving device 70 and also for performing any required digital signal processing. A variety of other distributions exist depending on the nature of gateway 50 and receiving device 70.

Figure 6:
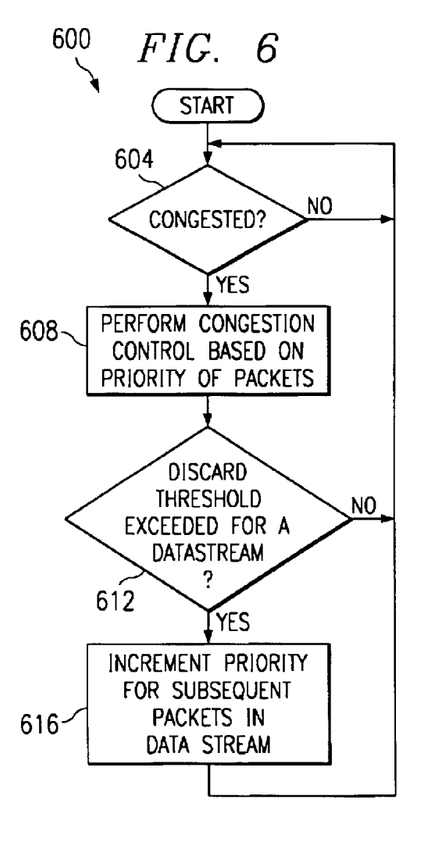
FIG. 6 is a flowchart illustrating one embodiment of a method for managing data streams across a network in accordance with the present invention.

FIG. 6 is a flowchart illustrating one embodiment of a method for managing time sensitive data streams by a routing device, such as, for example, routing device 32a, in a network in accordance with the present invention. The routing device periodically determines whether it is congested at decision block 604. If the routing device determines that it is congested, it performs congestion control based of the priority of the packets at function block 608. For example, the routing device may discard packets by increasing priority in attempting to alleviate congestion. At step 612, the routing device determines whether, during the congestion control, it has discarded more than a threshold number of packets from a data stream. The threshold number could be a predetermined value or a value calculated currently by the routing device. If the number of segments discarded from the data stream does not exceed the threshold number, the routing device returns to decision block 604. If, however, the number of segments discarded from the data stream does exceed the threshold number, the routing device increments the priority indicator in subsequently routed packets in the data stream at function block 616. The routing device then returns to decision block 604.

Although a variety of operations have been discussed with respect to flowchart 600, other embodiments of the present invention may include none, one, some, or all of the operations and/or additional operations. For example, instead of being performed based on priority, the congestion control may be performed by discarding a certain number of packets regardless of priority. As another example, the indicator may be set if any packets are discarded from a data stream. As a further example, other operations and orderings will be readily suggested to those skilled in the art.

Figure 7A:
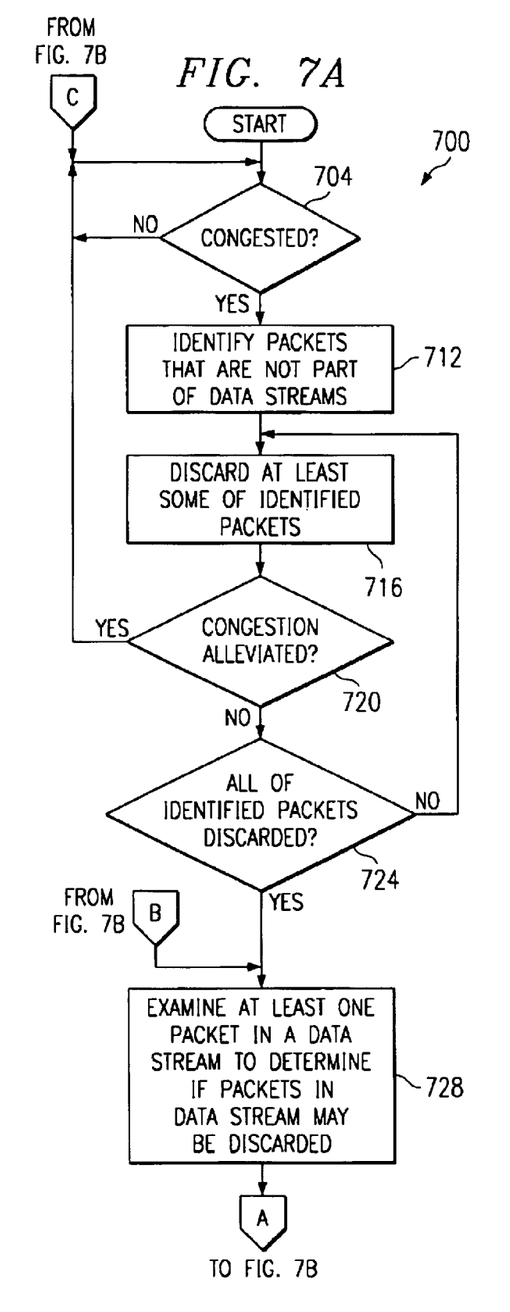
FIG. 7 is a flowchart illustrating another embodiment of a method for managing data streams across a network in accordance with the present invention.
Figure 7B:
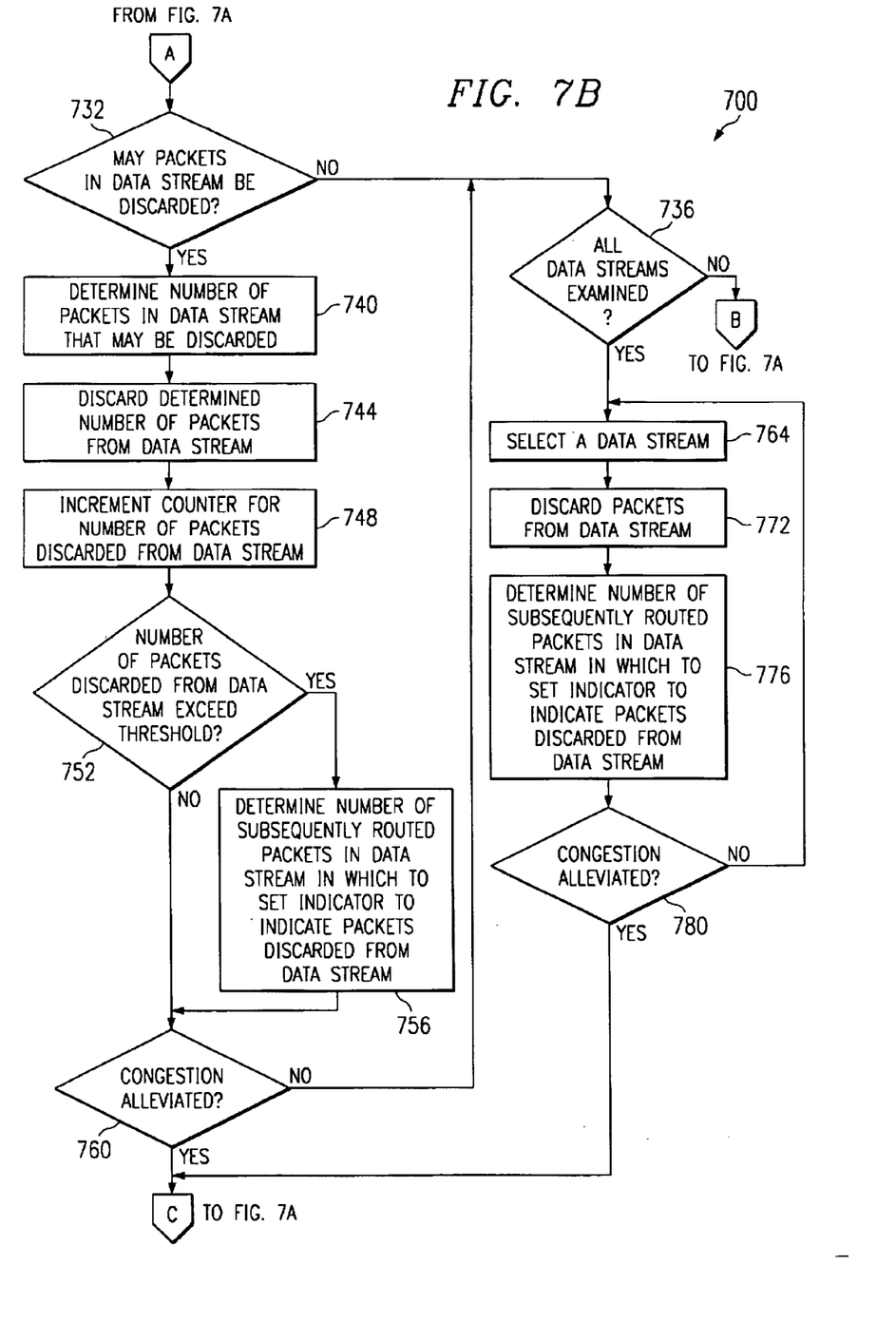

FIG. 7 is a flowchart 700 illustrating another embodiment of the operations for a routing device in accordance with the present invention. In this embodiment, the routing device discards all of the segments that are not part of data streams before beginning to discard segments that are part of data streams. At decision block 704, the routing device periodically determines whether it is congested. Note, congestion may be based on all of the packets to be routed, a subset of the packets to be routed, or an estimation of the packets to be routed. If the routing device determines it is congested, the routing device identifies packets that are not part of data streams at function block 712. The routing device may determine this by examining the type of data in a packet, the destination address of the packet, and/or any other appropriate indicator. At function block 716, the routing device discards at least some of the identified packets. The routing device determines at function block 720 whether the congestion has been alleviated, i.e., whether a sufficient amount of packets has been discarded. If the congestion has been alleviated, the routing device returns to decision block 704. If, however, the congestion persists, the routing device determines whether all of the identified packets has been discarded at decision block 724. If all of the identified packets have not been discarded, the routing device returns to function block 716. If, however, all of the identified packets have been discarded, the routing device begins to discard packets in data streams.

At function block 728, the routing device examines at least one packet in a data stream to determine if packets in that data stream may be discarded. The routing device may examine any appropriate type of indicator to make this determination. If the routing device determines at decision block 732 that packets in the data stream may be discarded, the routing device determines the number of packets in the data stream that may be discarded without degrading data quality to an unacceptable level at function block 740. To accomplish this, the routing device may, for example, have a default value stored as to the number of packets in the data stream that may be discarded or may have a default value stored as to the number of packets containing a particular type of data that may be discarded. As another example, the routing device may actually determine the amount of information represented by the data in each packet, by, for example, examining the amount of data in the packet and the type of data to determine the amount of information represented by each packet.

Note, the routing device may examine, or may have been examining, the packets in the data stream to determine how many packets, if any, have been previously discarded from the data stream. For example, the routing device may have been examining sequence numbers in the packets, or the packets may contain an in-band counter, such as, for example, an RTP extension, that informs the routing device how many packets have been discarded from the data stream. Other examples exist. Packets may have been discarded from the data stream by another routing device without the indicator being set because the threshold was not exceeded. The determined number may be used in determining the number of packets that may be discarded by the routing device.

After determining the number of packets that may be discarded, the routing device discards the determined number of packets from the data stream at function block 744. At function block 748, the routing device increments a counter for the number of packets discarded from the data stream. At decision block 752, the routing device determines, based on the counter, whether the number of packets discarded from the data stream discarded exceeds a threshold. The threshold could be equal to the number of packets that may be discarded from the data stream, a default number, such as, for example, two, a number calculated based on the amount of information represented by each packet in the data stream, or any other. If the number of packets discarded from the data stream exceeds the threshold, the routing device determines the number of subsequently routed packets in the data stream in which to set an indicator to indicate that packets have been discarded from the data stream. This number could be based on the amount and type of data in each packet. For example, for audio data, setting the indicator in two seconds worth of data should allow a receiving device to establish an acceptable operating level after handling the discarded packets. At decision block 760, the routing device determines whether a sufficient amount of packets has been discarded to alleviate the congestion. If a sufficient amount of packets has been discarded, the routing device returns to decision block 704. If, however, a sufficient amount of packets has not been discarded, the routing device will examine other data streams, if any, to determine if packets may be discarded from them.

At decision block 736, the routing device determines whether all of the data streams have been examined. If all of the data streams have not been examined, the routing device returns to function block 728 to determine whether there is another data stream from which packets may be discarded. If, however, all of the data streams have been examined at decision block 728, congestion still persists, and the routing device may take further measures to alleviate the congestion.

At function block 764, the routing device selects a data stream based on any appropriate criteria. At function block 772, the routing device discards the packets from the data stream. At function block 776, the routing device determines the number of subsequently routed packets in the data stream in which to set an indicator to indicate that packets have been discarded from the data stream. The routing device determines whether a sufficient amount of packets has been discarded to alleviate the congestion at decision block 780. If a sufficient amount of packets has been discarded, the routing device returns to function block 704. If, however, a sufficient amount of packets has not been discarded, the routing device returns to function block 764 to select another data stream from which it will discard packets.

Although flowchart 700 illustrates a variety of operations for a routing device, in other embodiments, the routing device may have none, one, some, or all of these operations and/or additional operations. For example, in particular embodiments, the routing device may simply discard packets that are not part of streams and packets that are part of streams simultaneously, instead of discarding them based on type. As another example, in certain embodiments, the routing device may set the indicator for a number of packets when it discards any number of packets from the data stream, making the counter unnecessary. As a further example, in some embodiments, the routing device may not be able to discard the determined number of packets from a data stream at one time because there may be an insufficient number of packets in the data stream at the routing device at that time. In this case, the routing device will have to remember which data stream it has determined that packets may be discarded from and discard the appropriate number of packets for that data stream as they arrive. A variety of other operations and arrangements of operations will be readily suggested to those skilled in the art.

Although several embodiments of the present invention have been discussed, numerous additions, deletions, substitutions, and/or alterations to the invention may be readily suggested to one of skill in the art without departing from the scope of the appended claims. It is intended therefore that the appended claims encompass such additions, deletions, substitutions, and/or alterations.

What is claimed is:

1. A method for managing data streams, comprising:
   receiving a plurality of packets, each packet associated with a data connection, at least some of the packets being part of a data stream;
   performing congestion control by discarding at least some of the packets; and
   setting an indicator in at least some of the subsequent packets in the data stream if packets have been discarded from the data stream, the indicator operable to indicate that packets in the data stream have been discarded.

2. The method of claim 1, wherein the data stream comprises time sensitive data.

3. The method of claim 2, wherein the time sensitive data comprises real-time data.

4. The method of claim 2, wherein the time sensitive data comprises audio data.

5. The method of claim 1, further comprising:
   determining whether packets in the data stream may be discarded; and
   dropping packets from the data stream only if packets in the data stream may be discarded.

6. The method of claim 1, further comprising:
   performing congestion control based on priority of the packets; and
   setting an indicator in subsequent packets in the data stream by increasing a priority indicator in the subsequent packets.

7. The method of claim 1, wherein the packets discarded from the data stream comprises no more than the packets that contain data representing twenty milliseconds of audible sound in a group of packets that contain data representing one-hundred milliseconds of audible sound.

8. The method of claim 1, further comprising:
   determining whether the number of packets discarded from the data stream exceeds a threshold; and
   setting an indicator in response to the number exceeding the threshold.

9. The method of claim 8, wherein the threshold is based on the amount and type of data in each packet.

10. The method of claim 1, wherein the packets in the data stream are Internet protocol packets, and the indicator is the type-of-service indicator.

11. A set of logic encoded in media for managing data streaming data, the logic operable to:
    receive a plurality of packets, each packet associated with a data connection, at least some of the packets being part of a data stream;
    perform congestion control by discarding at least some of the packets; and
    set an indicator in at least some of the subsequent packets in the data stream if packets have been discarded from the data stream, the indicator operable to indicate that packets in the data stream have been discarded.

12. The logic of claim 11, wherein the data stream comprises time sensitive data.

13. The logic of claim 12, wherein the time sensitive data comprises real-time data.

14. The logic of claim 12, wherein the time sensitive data comprises audio data.

15. The logic of claim 11, wherein the logic is further operable to:
    determine whether packets in the data stream may be discarded; and
    discard packets from the data stream only if packets in the data stream may be discarded.

16. The logic of claim 11, wherein the logic is further operable to:
    perform congestion control based on priority of the packets; and
    set an indicator in subsequent packets in the data stream by increasing a priority indicator in the subsequent packets.

17. The logic of claim 11, wherein the logic is further operable to:
  determine the amount of audible sound represented by each packet; and
  establish packets being discarded as being no more than the packets that contain data representing twenty milliseconds of audible sound in a group of packets that contain data representing one-hundred milliseconds of audible sound.

18. The logic of claim 11, wherein the logic is further operable to:
  determine whether the number of packets discarded from the data stream exceeds a threshold; and
  set an indicator in response to the number exceeding the threshold.

19. The logic of claim 18, wherein the threshold is based on the amount and type of data in each packet.

20. The logic of claim 11, wherein the packets in the data stream are Internet protocol packets, and the indicator is the type-of-service indicator.

21. An apparatus for managing data streams, comprising:
  means for receiving a plurality of packets, each packet associated with a data connection, at least some of the packets being part of a data stream;
  means for performing congestion control by discarding at least some of the packets; and
  means for setting an indicator in at least some of the subsequent packets in the data stream if packets have been discarded from the data stream, the indicator operable to indicate that packets in the data stream have been discarded.

22. The apparatus of claim 21, wherein the data stream comprises time sensitive data.

23. The apparatus of claim 22, wherein the time sensitive data comprises real-time data.

24. The apparatus of claim 22, wherein the time sensitive data comprises audio data.

25. The apparatus of claim 21, further comprising:
  means for determining whether packets in the data stream may be discarded; and
  means for discarding packets from the data stream only if packets in the data stream may be discarded.

26. The apparatus of claim 21, further comprising:
  means for performing congestion control based on priority of the packets; and
  means for setting an indicator in subsequent packets in the data stream by increasing a priority indicator in the subsequent packets.

27. The apparatus of claim 21, wherein the packets discarded from the data stream comprise no more than the packets that contain data representing twenty milliseconds of audible sound in a group of packets that contain data representing one-hundred milliseconds of audible sound.

28. The apparatus of claim 21, further comprising:
  means for determining whether the number of packets discarded from the data stream exceeds a threshold; and
  means for setting an indicator in response to the number exceeding the threshold.

29. The apparatus of claim 28, wherein the threshold is based on the amount and type of data in each packet.

30. The apparatus of claim 21, wherein the packets in the data stream are Internet protocol packets, and the indicator is the type-of-service indicator.

31. A network element for transporting packetized data, comprising:
  a communication interface operable to receive a plurality of Internet protocol (IP) packets, each packet associated with a data connection, at least some of the packets being part of a data stream containing audio data;
  a memory coupled to the communication interface, the memory operable to buffer the IP packets; and
  a processor coupled to the memory, the processor operable to:
    perform congestion control based on a priority value in the type-of-service (TOS) field of each packet, and
    increase the priority value in the TOS field for at least some of the subsequently routed packets in the data stream to indicate that packets in the data stream have been discarded if packets in the data stream have been discarded.

32. The network element of claim 31, wherein no more than the packets that represent thirty milliseconds of audio in a group of packets that represent one-hundred milliseconds of audio may be discarded.

33. The network element of claim 31, wherein the indicator is set in the next five subsequently routed packets in the data stream.

34. The network element of claim 31, wherein the processor is further operable to determine the number of subsequently routed packets in the data stream in which to increase the priority.

35. The network element of claim 31, wherein the processor is further operable to determine if packets in the data stream may be discarded.

36. A propagated signal on a transmission medium in a network, comprising:
  an Internet protocol (IP) packet of a data stream, the IP packet including a header and a payload;
  the header including an indicator adjusted in the network based on discards of preceding IP packets from the data stream; and
  the payload containing time sensitive data.

37. The signal of claim 36, wherein the value in the type-of-service field in the header is the indicator.

38. A system for managing time sensitive data streams across a network, comprising a plurality of routing devices coupled to each other, the routing devices operable to receive and route packets, at least some of the packets being part of a data stream, the routing devices further operable to determine if they are congested and discard packets to alleviate the congestion, the routing devices additionally operable to set an indicator in subsequently routed packets in the data stream if packets are discarded from the data stream.

39. The system of claim 38, wherein:
  the packets in the data stream contain data representing audible sound; and
  no more than the packets that represent thirty milliseconds of audible sound in a group of packets that represent one-hundred milliseconds of audible sound may be discarded.

40. The system of claim 38, wherein the indicator is set in the next five subsequently routed packets in the data stream.

41. The system of claim 38, wherein the processor is further operable to determine the number of subsequently routed packets in the data stream in which to set the indicator.

42. The system of claim 38, wherein:
  the packets are Internet protocol packets; and
  the indicator is the value in the type-of-service field.

43. The system of claim 38, wherein the routing devices are further operable to determine if packets in the data stream may be discarded.

* * * * *